United States Patent [19]
Bryon et al.

[11] Patent Number: 5,872,649
[45] Date of Patent: Feb. 16, 1999

[54] GAIN CLAMPED AMPLIFIER

[75] Inventors: Kevin Christopher Bryon, Herts; Kate Sugden, Birmingham, both of United Kingdom

[73] Assignee: Northern Telecom Limited, Montreal, Canada

[21] Appl. No.: 760,175

[22] Filed: Dec. 4, 1996

[30] Foreign Application Priority Data

Dec. 16, 1995 [GB] United Kingdom ............. 9525766

[51] Int. Cl.$^6$ ................. H01S 3/06; H01S 3/17
[52] U.S. Cl. ............... 359/341; 359/133; 359/340; 359/346; 385/8; 372/6
[58] Field of Search ................. 359/133, 177, 359/340, 341, 346; 385/3, 8; 372/6, 18, 19

[56] References Cited

U.S. PATENT DOCUMENTS

| | | | |
|---|---|---|---|
| 5,166,940 | 11/1992 | Tumminelli et al. | 372/6 |
| 5,191,586 | 3/1993 | Huber | 372/6 |
| 5,200,964 | 4/1993 | Huber | 372/6 |
| 5,394,265 | 2/1995 | Nagel et al. | 359/341 |
| 5,532,864 | 7/1996 | Alexander et al. | 359/160 |
| 5,557,442 | 9/1996 | Huber | 359/160 |
| 5,600,473 | 2/1997 | Huber | 359/341 |
| 5,608,571 | 3/1997 | Epworth et al. | 359/341 |

FOREIGN PATENT DOCUMENTS

| | | |
|---|---|---|
| 2278716 | 12/1994 | United Kingdom . |
| 2308222 | 6/1997 | United Kingdom . |
| WO 95/22847 | 8/1995 | WIPO ............ H01S 3/06 |

OTHER PUBLICATIONS

Zucker et al, Electronics Letters, vol. 28, #20, pp. 1888–1889, Sep. 24, 1992; Abst. Only Herewith.

Baker et al, Electronics Letters, vol. 25, #17, pp. 1131–1133, Aug. 17, 1989; Abst. Only Herewith.

Burn et al, IEE Colloq. Applic. of Vetrashort Pulses for Optaelectronics, pp. 11–1–11–4, 1989 (UK):Abst .

Farries et al, IEE Colloq. in Opt. Fibre Gratings & Their Applic., pp. 4/1–4/5, (U.K.) Abst. Only Herewith.

Rourke et al, IEE Colloq. in Optical Fibre Gratings and Their Applic., Jan. 30, 1995, pp. 8/1–8/5.

Delevaque, et al., "Gain Control in Erbium–Doped Fibre Amplifiers by Lasing at 1480nm With Photoinduced Bragg Gratings Written on Fibre Ends," Electronic Letters, Jun. 10, 1993, vol. 29, No. 12, pp. 1112–1114.

*Primary Examiner*—Nelson Moskowitz
*Attorney, Agent, or Firm*—John D. Crane

[57] ABSTRACT

The gain provided by an erbium amplifier is stabilised by spectrally selective optical feedback to make the amplifier lase. The resulting laser emission is extracted from the amplifier output using a Mach Zehnder with matched Bragg reflectors in its two interference arms. The extracted light may be used for supervisory purposes. Part of the laser cavity defining feedback may be provided by the Mach Zehnder by arranging one of its Bragg reflectors to be displaced with respect to the other.

4 Claims, 2 Drawing Sheets

GAIN CLAMPED AMPLIFIER

BACKGROUND TO THE INVENTION

This invention relates to optical amplifiers.

A paper by E. Delevaque et al entitled, 'Gain Control in Erbium-Doped Fibre Amplifiers by Lasing at 1480 nm with photo induced Bragg Gratings Written on Fibre Ends', Electronics Letters 10 Jun. 1993, Vol. 29, No. 12, pages 1112–4, describes how the gain afforded by an optical amplifier can be controlled by providing its optically amplifying medium with wavelength selective feedback sufficient to cause it to lase at some predetermined wavelength separated from the waveband within which the amplifier is designed to function as an amplifier.

A consequence of this form of gain control is that the amplified output signal provided by the amplifier is accompanied by laser emission generated by the amplifier.

SUMMARY OF THE INVENTION

The present invention is concerned with diverting such emission from the output signal path in a manner that enables such diversion to be used to perform an additional function. Thus the diverted laser emission can be fed to an optical modulator, for instance for generating a supervisory signal that is then multiplexed with the amplified output signal for onward transmission. Alternatively, or additionally, the diversion can be accomplished in a way that relatively readily allows the magnitude of the feedback to be adjusted to a preferred value.

According to the present invention there is provided a method of amplifying an optical signal using an optical amplifier having interposed between a signal input and a signal output thereof an optically amplifying medium provided with wavelength selective optical feedback at a wavelength different from that of any part of the optical signal, and wherein some laser power generated by said feedback is diverted from the signal output of the amplifier by a Mach Zehnder waveguide configuration having first and second interference arms in each of which is positioned a retro-reflecting Bragg reflector selectively reflecting at said feedback wavelength.

The invention also provides an optical amplifier having an optically amplifying medium provided with wavelength selective optical feedback means to provide laser emission at a predetermined wavelength, and having optically in series with the optically amplifying medium a Mach Zehnder waveguide configuration having first and second interference arms in each of which is positioned a retro-reflecting Bragg reflector selectively reflecting at said predetermined wavelength.

BRIEF DESCRIPTION OF THE DRAWINGS

There follows a description of optical amplifiers, and their operation, embodying the invention in preferred forms. The description refers to the accompanying drawings in which.

DETAILED DESCRIPTION OF PREFERRED EMBODIMENTS

Figure 1:
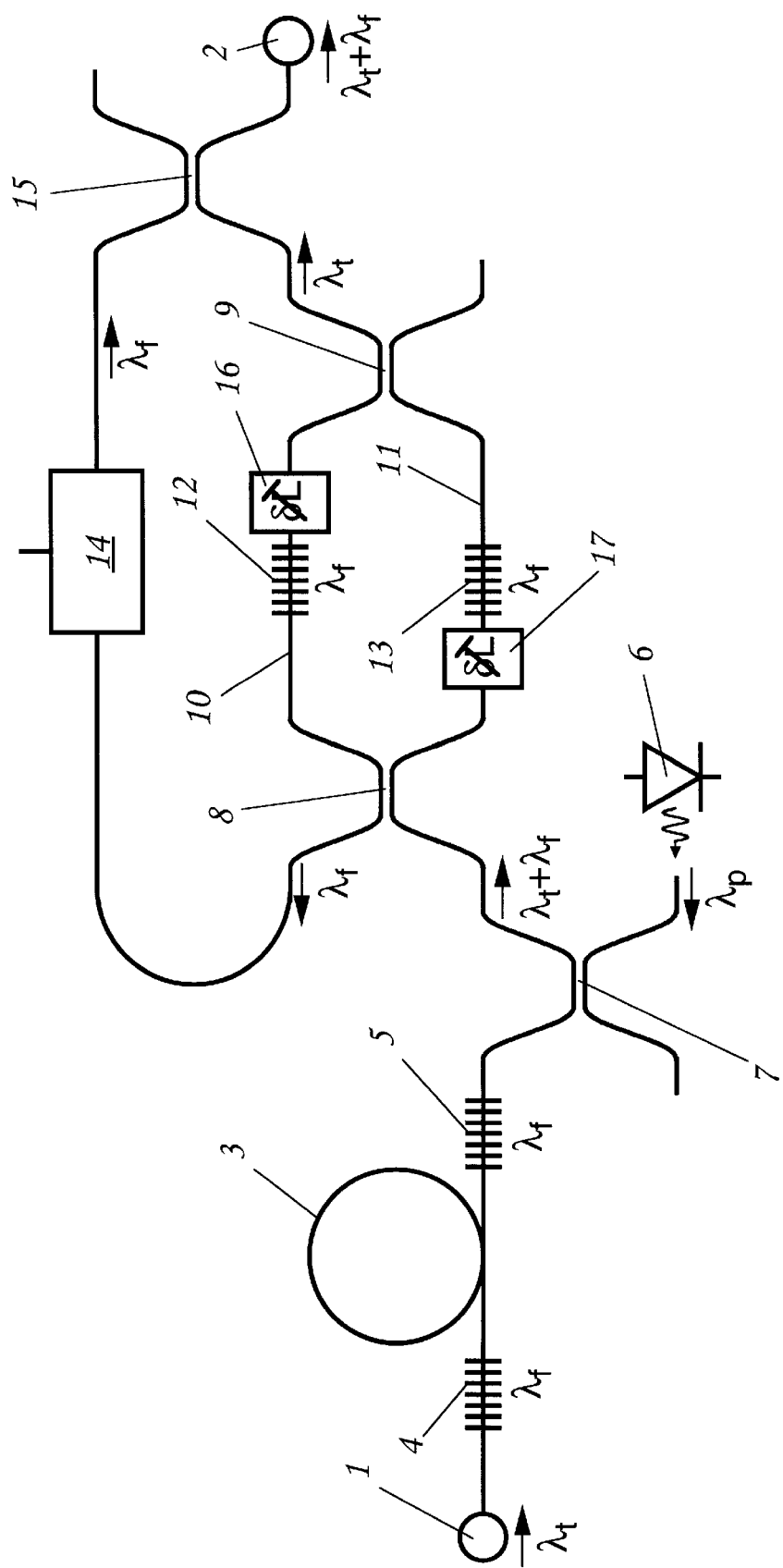
FIGS. 1 and 2 are schematic diagrams of two alternative optical amplifiers both embodying the present invention in preferred forms.

Referring first to FIG. 1, an optical amplifier, provided with an input terminal 1 and an output terminal 2, includes a length of optically amplifying medium 3, typically a length of erbium doped optical waveguide that may be an optical fibre waveguide. This optically amplifying medium is provided wavelength selective feedback, typically constituted by a pair of retro-reflecting Bragg grating optical waveguide reflectors 4, 5 selectively reflecting at a wavelength $\lambda_f$ lying within the amplification waveband of the amplifying medium 3 in order to make the amplifying medium lase at this wavelength. The signal (traffic) applied to the input terminal 1 for amplification by the amplifier lies within a waveband $\lambda_t$. This signal does not include any component at the lasing wavelength $\lambda_f$. For an erbium amplifier $\lambda_f$, may typically be 1520 nm, while $\lambda_t$ may typically extend from 1530 to 1550 nm. An erbium amplifier requires optical pumping, and this is represented as being provided by a pump 6 emitting at a wavelength $\lambda_p$, and whose emission is coupled to the amplifying medium by means of a wavelength multiplexing coupler 7. For illustrative convenience, this optical pumping has been represented as counter-pumping applied externally of the optical cavity defined by reflectors 4 and 5. The pumping can alternatively be co-pumping, or a combination of both counter-pumping and co-pumping, and such pumping can alternatively be applied internally of the cavity.

Downstream of the amplifying medium 3 and its optical cavity defining reflectors 4 and 5, is a Mach Zehnder optical wavelength configuration formed by two 3 dB single mode waveguide couplers 8 and 9 interconnected by a pair of single mode waveguides 10 and 11 constituting the two interference arms of the Mach Zehnder. The two interference arms provided with a matched pair of retro-reflecting Bragg grating optical waveguide reflectors 12, 13 selectively reflecting at the lasing wavelength $\lambda_f$. If these two gratings are equidistant from 3 dB coupler 8, then light at wavelength $\lambda_f$ launched into the Mach Zehnder from the amplifying medium 3 will be reflected in the two interference arms 10, 11 to emerge from 3 dB coupler 8 by way of its other port, which is connected to an optical modulator 14. This will also happen if the distances of the reflectors 12, 13 differ by an amount corresponding to a phase difference of $n\pi$, where n is a positive integer. Similarly, if the two interference 10, 11 arms are of equal optical path distance, then light within the waveband $\lambda_t$ launched into the Mach Zehnder from the amplifying medium 3 will emerge from 3 dB coupler 9 by way of the port coupled to the output terminal 2 by way of a wavelength multiplexing coupler 15. This too will also happen if the optical path distances of the interference arms 10, 11 differ by an amount corresponding to a phase difference of $2n\pi$ where n is a positive integer, in this instance however achieving the correct phase relationship within a non-zero path difference is more difficult if the signal within the waveband $\lambda_t$ contains a number of different wavelengths.

The required phase relationships are obtained by means of a pair of optical path length trimming adjusters 16 and 17. These may be constituted by regions of waveguide where the effective refractive index can be changed utilising the photorefractive effect produced by irradiation with a high flux density of ultra-violet light.

In this example of optical amplifier, the Mach Zehnder has been used not only to divert the laser emission at $\lambda_f$ from the output of the amplifier, but also to use the diverted power for an ancillary signalling purpose, such as the generation of a supervisory signal, by directing it through a modulator, and then remultiplexing it with the input of the amplifier.

Figure 2:
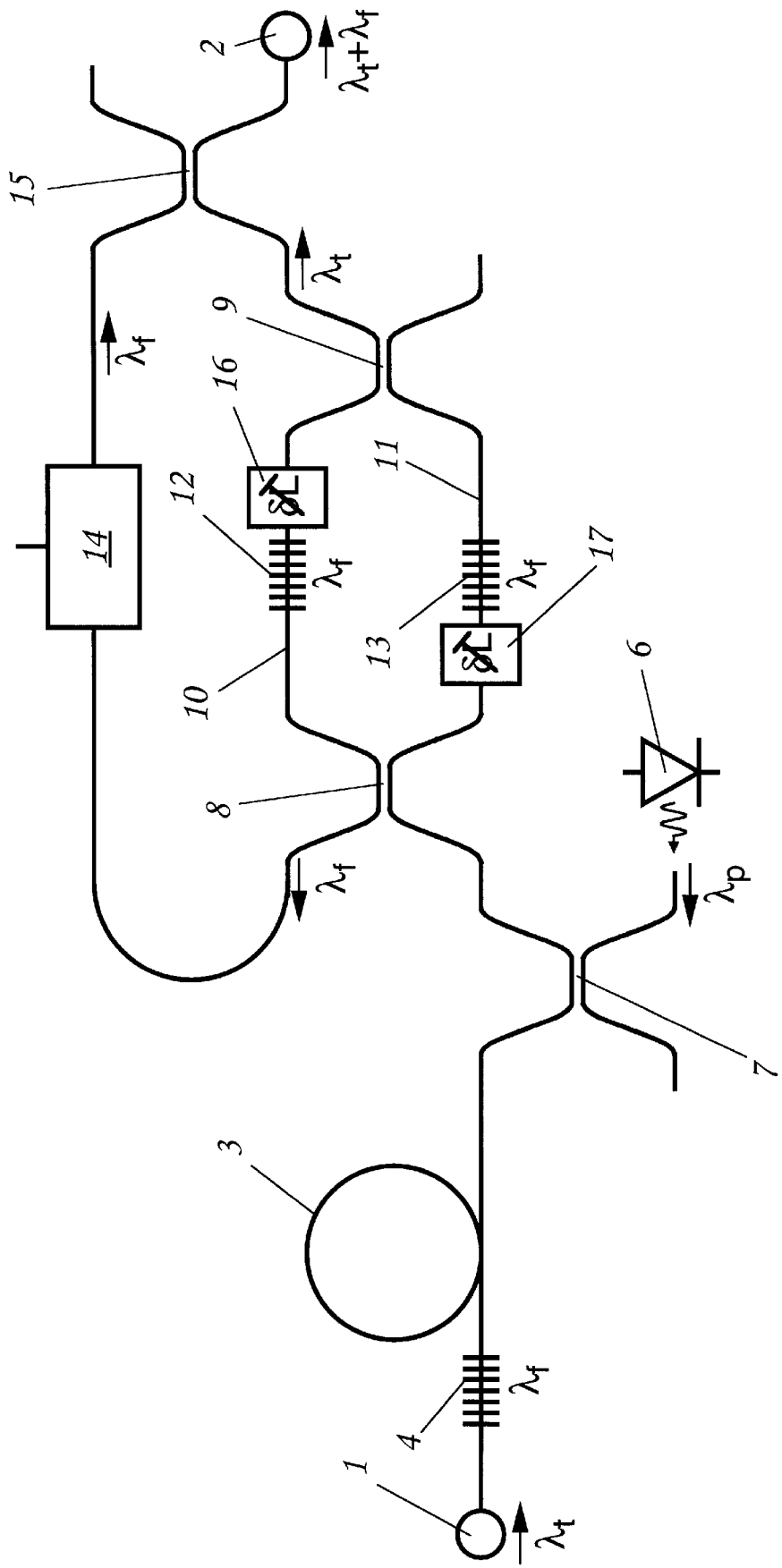

The components of the amplifier now to be described with reference to FIG. 2 are the same as those of the amplifier of FIG. 1, with the exception of the omission of Bragg reflector 5. Additionally optical path length timing adjuster 17 is trimmed to produce a difference phase relationship, and a consequential change is made to the value of the optical path length provided by trimming adjuster 16.

Bragg reflector 5 has been dispensed with, and the feedback that this reflector provided in the amplifier of FIG. 1 is, in FIG. 2, provided by the Mach Zehnder. For this purpose the value of optical path length trimming provided by adjuster 17 must be such that the two Bragg gratings 12 and 13 differ in optical path length from 3 dB coupler 8 by a non-zero amount that corresponds to a phase difference of $(n+\epsilon)\pi$, where n is zero or a positive integer, and $0<\epsilon<1$. Under these conditions, the light at wavelength $\lambda_f$ launched into the Mach Zehnder will be reflected in the two interference arms, but not all of that reflected light will emerge from 3 dB coupler 8 by way of its port connected to modulator 14—some will emerge by way of the port by which it originally entered, and will thus provide optical feedback. The magnitude of this feedback depends upon the value of $\epsilon$, approaching zero when $\epsilon$ approaches zero, and approaching 100% when $\epsilon$ approaches 1.

It is thus seen that adjustment of the optical path distance provided by trimming adjuster 17 provides a much easier way of adjusting the Q of the laser cavity than by adjusting it by replacing one of the Bragg reflectors 4 or 5 from the FIG. 1 amplifier by a Bragg reflector of a different reflectivity.

Once trimming adjuster 17 has been set to the required value, adjuster 16 then has to be set to its required value to restore the phase relationship required at 3 dB coupler 9, this being the same required relationship as that described above in relation to the 3 dB coupler 9 of the FIG. 1 amplifier.

In this amplifier, as in the case of the amplifier of FIG. 1, the laser emission at $\lambda_f$ that is diverted by the Mach Zehnder from the output of the amplifier is optionally put to use in generating an ancillary signal, using modulator 14, which is then remultiplexed back on to the output of the amplifier by means of wavelength multiplexing coupler 15.

We claim:

1. A method of amplifying an optical signal using an optical amplifier having interposed between a signal input and a signal output thereof an optically amplifying medium provided with wavelength selective optical feedback at a wavelength different from that of any part of the optical signal, wherein some laser power generated by said feedback is diverted from the signal output of the amplifier by a Mach Zehnder waveguide configuration having first and second interference arms in each of which is positioned a retro-reflecting Bragg reflector selectively reflecting at said feedback wavelength, and wherein the diverted laser power is fed to an optical modulator to provide an ancillary signal that is multiplexed with the output of the amplifier.

2. A method as claimed in claim 1, wherein part of the wavelength selective optical feedback for the optically amplifying medium is provided by the Mach Zehnder waveguide configuration.

3. An optical amplifier having interposed between a signal input and a signal output thereof an optically amplifying medium provided with wavelength selective optical feedback means to provide laser emission at a predetermined wavelength, and having optically in series with the optically amplifying medium a Mach Zehnder waveguide configuration having first and second interference arms in each of which is positioned a retro-reflecting Bragg reflector selectively reflecting at said predetermined wavelength, and wherein the input of an optical modulator is optically coupled with the Mach Zehnder waveguide configuration to receive light reflected by the Bragg reflectors.

4. An optical amplifier as claimed in claim 3, wherein the Mach Zehnder waveguide configuration forms part of the wavelength selective optical feedback means of the optically amplifying medium.

* * * * *